United States Patent
McGee

(10) Patent No.: US 11,583,466 B1
(45) Date of Patent: Feb. 21, 2023

(54) WALKER CADDY DEVICE

(71) Applicant: Walter McGee, Elkins, WV (US)

(72) Inventor: Walter McGee, Elkins, WV (US)

(*) Notice: Subject to any disclaimer, the term of this patent is extended or adjusted under 35 U.S.C. 154(b) by 0 days.

(21) Appl. No.: 17/831,837

(22) Filed: Jun. 3, 2022

(51) Int. Cl.
| | |
|---|---|
| A61H 3/00 | (2006.01) |
| F21S 9/02 | (2006.01) |
| F21V 23/04 | (2006.01) |
| F16B 2/20 | (2006.01) |
| F21V 33/00 | (2006.01) |

(52) U.S. Cl.
CPC ............... *A61H 3/00* (2013.01); *F16B 2/20* (2013.01); *F21S 9/02* (2013.01); *F21V 23/04* (2013.01); *F21V 33/0068* (2013.01); *A61H 2003/004* (2013.01); *A61H 2201/0188* (2013.01)

(58) Field of Classification Search
CPC ............... A61H 3/00; A61H 2003/004; A61H 2201/0188; F16B 2/20; F21S 9/02; F21V 23/04; F21V 33/0068
See application file for complete search history.

(56) References Cited

U.S. PATENT DOCUMENTS

| | | | |
|---|---|---|---|
| 4,184,618 A | | 1/1980 | Jones |
| 4,659,099 A | * | 4/1987 | Malone ............... A61G 5/1094 5/507.1 |
| 5,531,238 A | | 7/1996 | Azzarelli |
| 10,174,932 B2 | | 1/2019 | Rosenblum |
| 2009/0310364 A1 | | 12/2009 | Turner |
| 2018/0369059 A1 | * | 12/2018 | Shirley ................... A61H 3/04 |

FOREIGN PATENT DOCUMENTS

| | | |
|---|---|---|
| CA | 22329485 | 8/2004 |
| DE | 10146034 | 5/2002 |

* cited by examiner

Primary Examiner — Thomas M Sember

(57) ABSTRACT

A walker caddy device for carrying items while using a walker and lighting a path in front of a user of the walker includes a caddy defining an interior space and having a support clip coupled to a back wall of the caddy. The support clip is configured to couple to an upper cross member of a walker with the caddy being supported by a lower cross member of the walker. The caddy has a light source coupled to a front wall powered by a power module for selectively lighting an area in front of the walker.

17 Claims, 6 Drawing Sheets

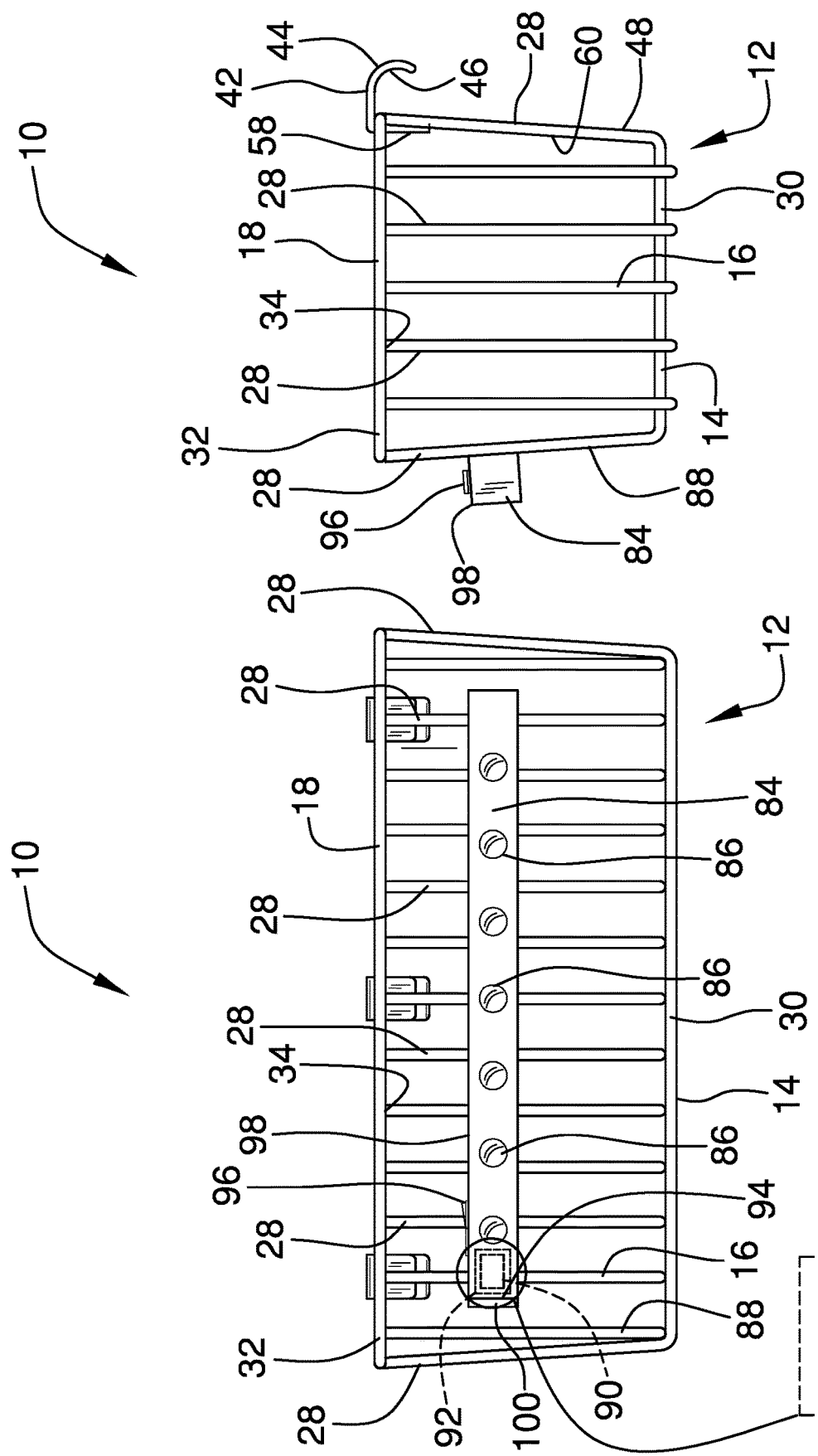

WALKER CADDY DEVICE

BACKGROUND

(1) Field of the Invention

The disclosure relates to walker caddy devices and more particularly pertains to a new walker caddy device for carrying items while using a walker and lighting a path in front of a user of the walker.

(2) Description of Related Art Including Information Disclosed Under 37 CFR 1.97 and 1.98

The prior art relates to walker caddies. Some of these devices are permanently coupled to a walker and can be positioned in a low area difficult to reach by some users. There are various iterations of devices that are removably couplable to more conveniently reachable areas near the walker handles, but none which provide the user access to an implement that allows the user to navigate dim pathways without having to reach for a light switch while walking, thereby letting go of the walker and leaving the user prone to injurious falls. The prior art also discloses a separate lighting device that attaches directly to the walker to light the pathways in front of a user but fails to provide a means for a user to carry items while using the walker. Additionally, the prior art does not disclose a walker caddy meant to attach to a walker with two front cross-members. The means by which the disclosed caddies secure to walkers would often be unable to function with a walker with two front cross-members or could lead to a user resorting to hanging the caddy on the lower of the two cross-members in an arrangement difficult to reach. Thus, the prior art lacks a walker caddy for carrying items while using a walker that couples to a walker with two front cross-members and lights dim pathways in front of the user.

BRIEF SUMMARY OF THE INVENTION

An embodiment of the disclosure meets the needs presented above by generally comprising a caddy defining an interior space and having a support clip coupled to a back wall of the caddy. The support clip is configured to couple to an upper cross member of a walker with the caddy being supported by a lower cross member of the walker. The caddy has a light source coupled to a front wall powered by a power module for selectively lighting an area in front of the walker.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a front view of an embodiment of the disclosure.

FIG. 4 is a side view of an embodiment of the disclosure.

DETAILED DESCRIPTION OF THE INVENTION

Figure 1:
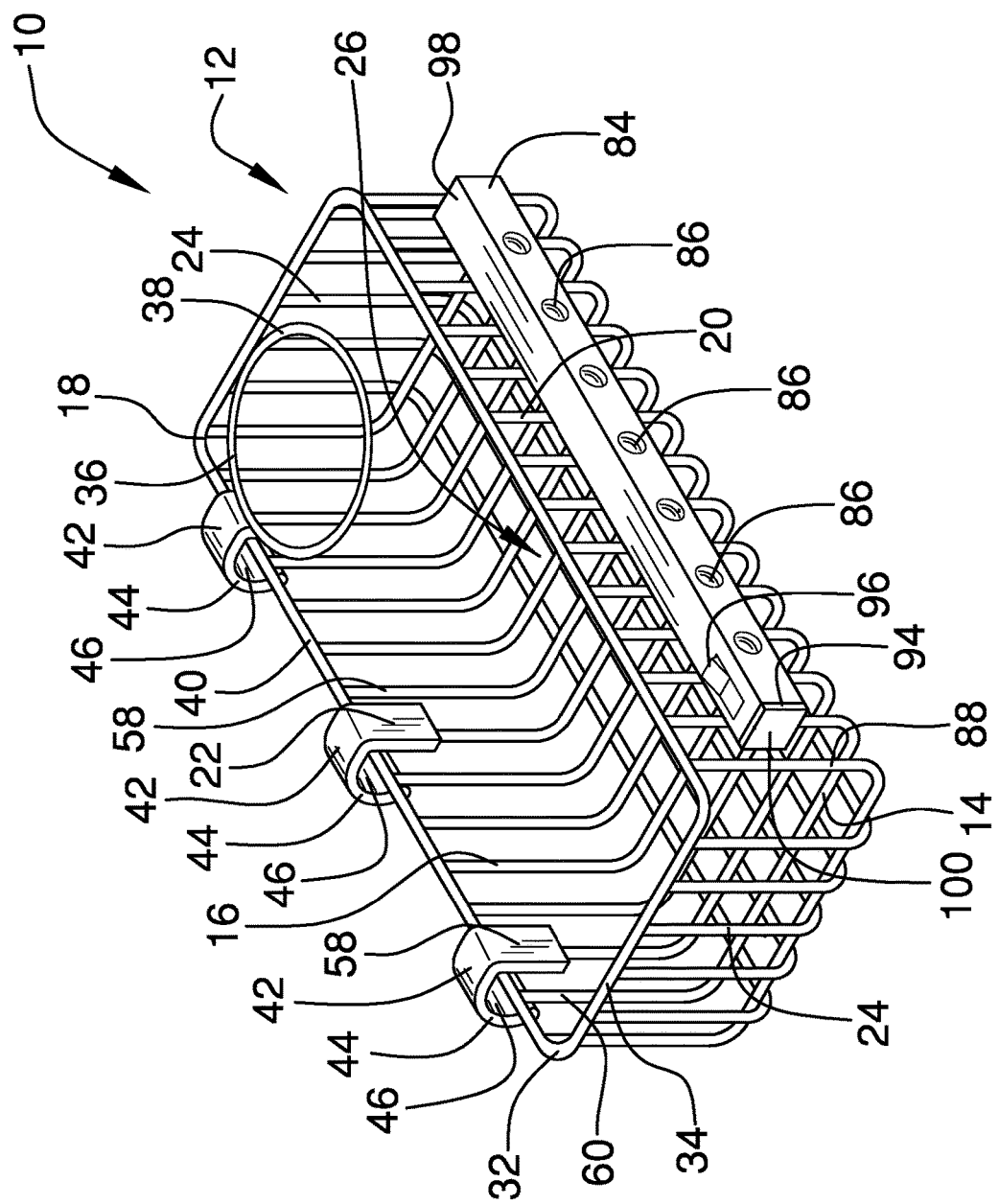
FIG. 1 is a top front side perspective view of a walker caddy device according to an embodiment of the disclosure.
Figure 2:
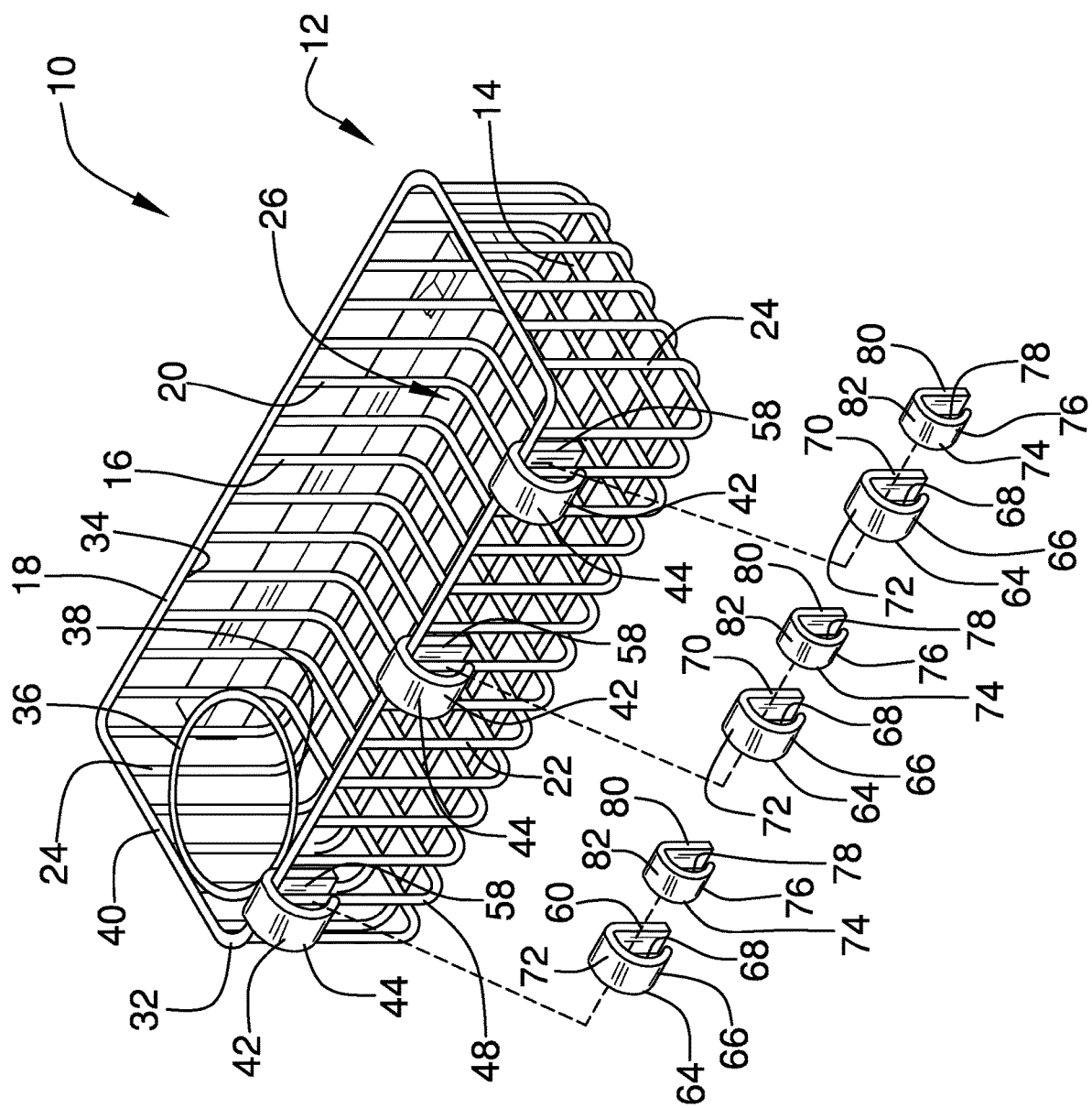
FIG. 2 is a top rear side perspective view of an embodiment of the disclosure.
Figure 5:
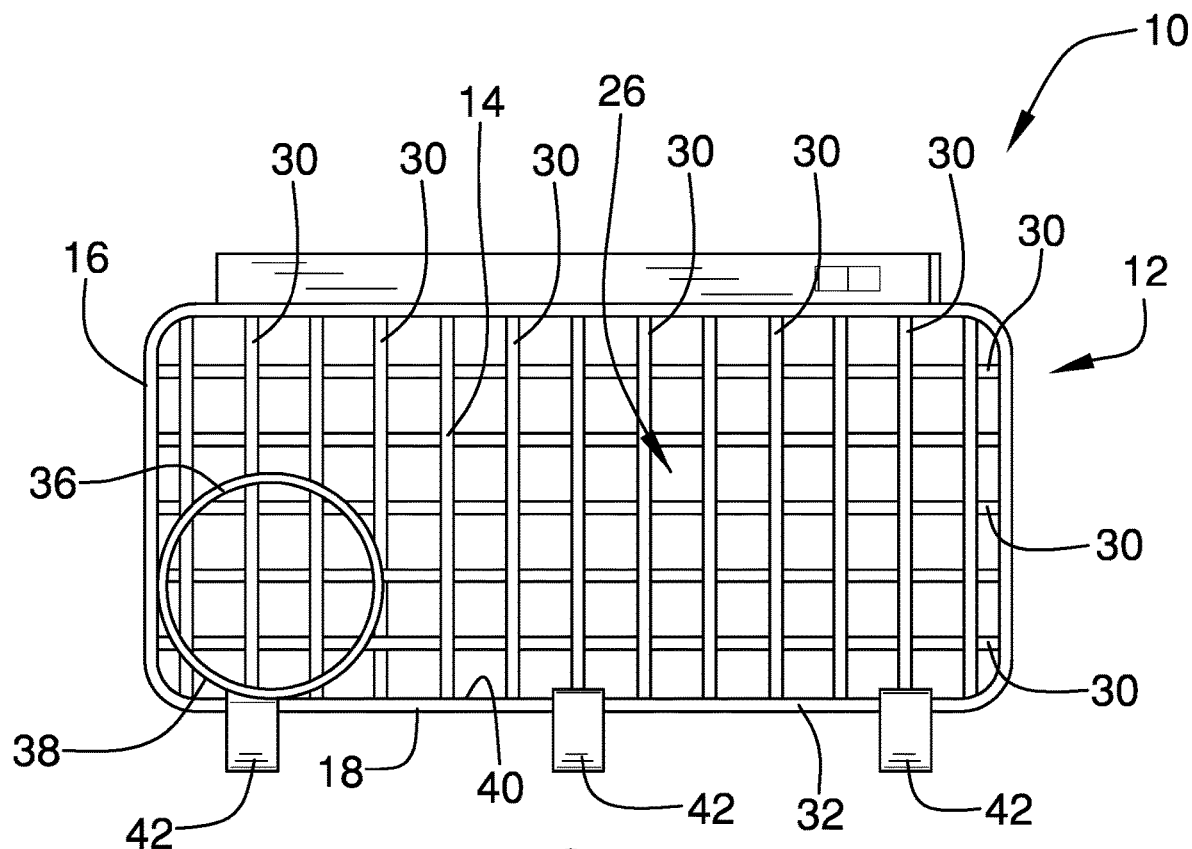
FIG. 5 is a top view of an embodiment of the disclosure.
Figure 6:
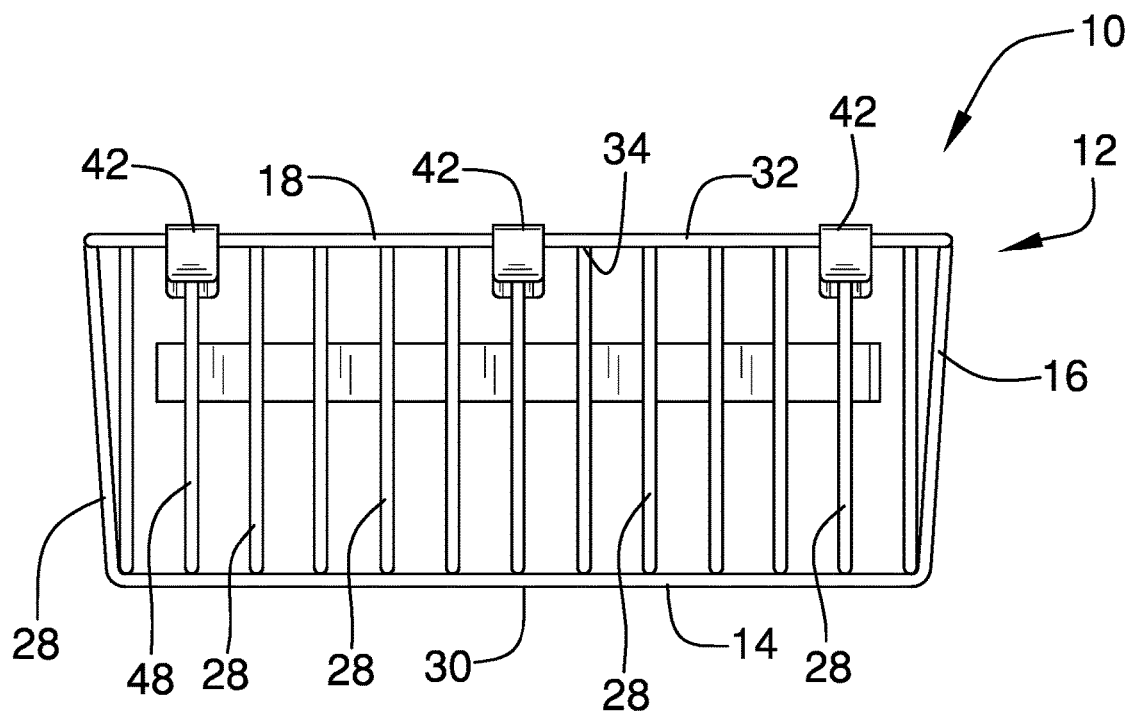
FIG. 6 is a rear view of an embodiment of the disclosure.
Figure 7:
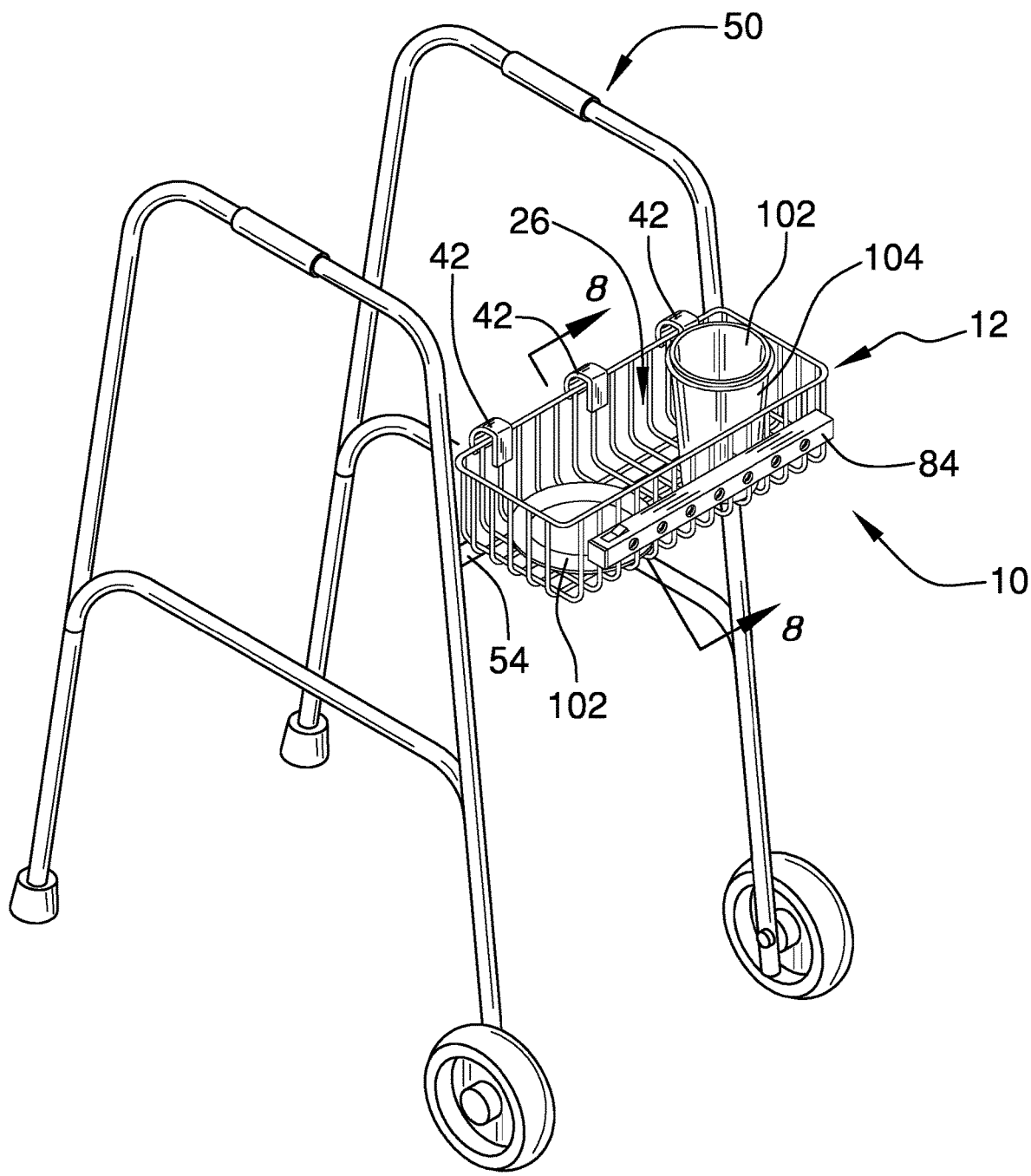
FIG. 7 is an in-use view of an embodiment of the disclosure.
Figure 8:
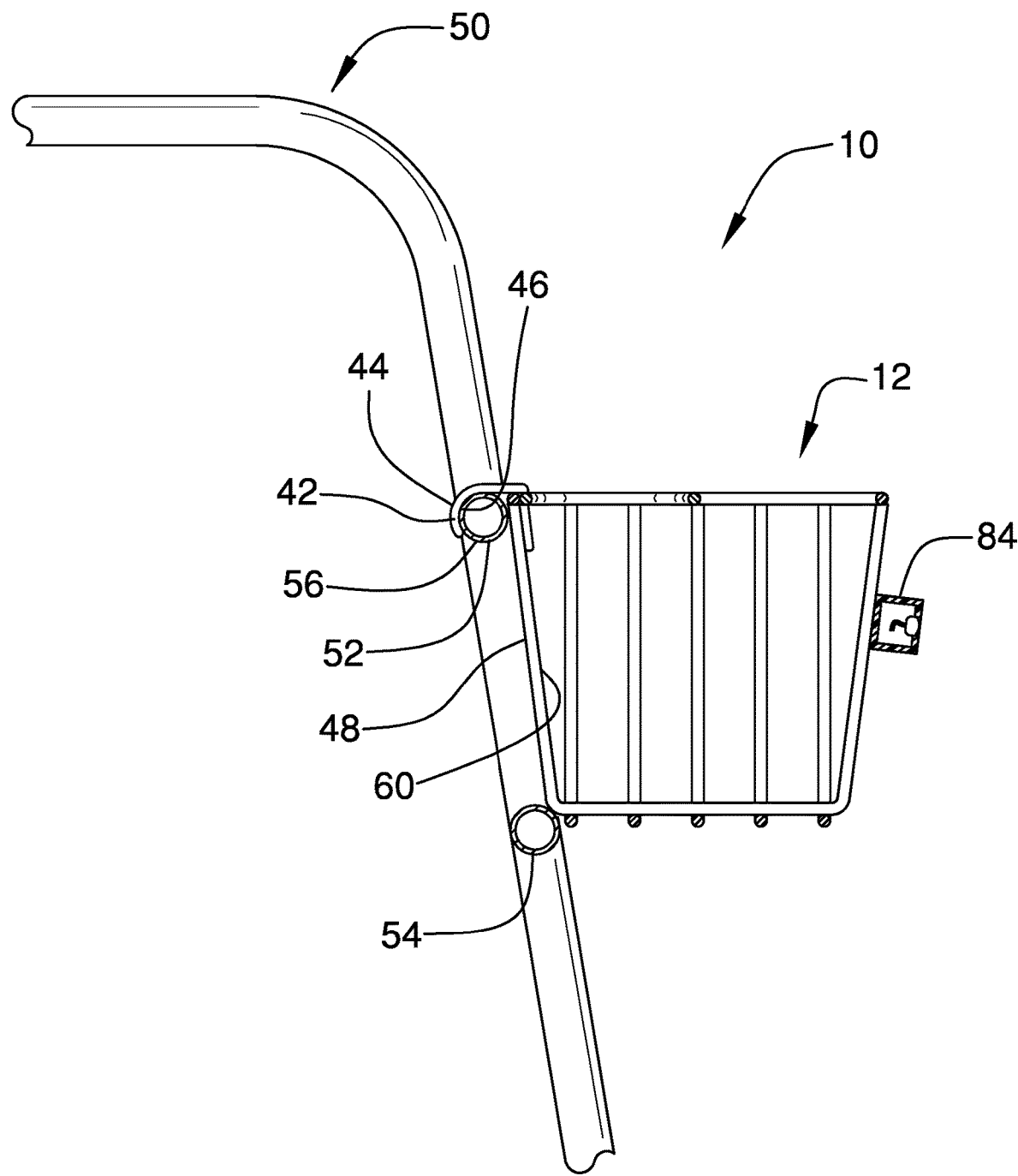
FIG. 8 is a cross-sectional in-use view of an embodiment of the disclosure in the direction of arrows 8-8 in FIG. 7.

With reference now to the drawings, and in particular to FIGS. 1 through 8 thereof, a new walker caddy device embodying the principles and concepts of an embodiment of the disclosure and generally designated by the reference numeral 10 will be described.

As best illustrated in FIGS. 1 through 8, the walker caddy device 10 generally comprises a caddy 12 having a bottom wall 14 and a perimeter wall 16 extending upward from the bottom wall 14 to a rim 18. The perimeter wall 16 includes a front wall 20, a back wall 22, and a pair of side walls 24 circumscribing an interior space 26 for a user to place items to be carried or held. The perimeter wall 16 of the caddy 12 is constructed of a plurality of perimeter wires 28 parallel to each other and extending between the bottom wall 14 and the rim 18. The bottom wall 14 is constructed of a first plurality of bottom wires 30 parallel to each other and extending between the side walls 24 and a second plurality of bottom wires 30 parallel to each other and extending between the front wall 20 and the back wall 22. The rim 18 is constructed of a rim wire 32 extending along a top edge 34 of the perimeter wall 16. A circular member 36 has an axis perpendicular to the bottom wall 14 extending through a center of the circular member 36. An outer edge 38 of the circular member 36 abuts and couples to an interior edge 40 of the rim 18 of the caddy 12. The circular member 36 is configured to receive a cup therethrough.

A plurality of support clips 42 is coupled to the back wall 22. Each support clip 42 extends laterally from the back wall 22 and has an arcuate portion 44, wherein an inner surface 46 of each arcuate portion 44 of each support clip 42 faces an exterior surface 48 of the back wall 22. Each inner surface 46 of each arcuate portion 44 of each support clip 42 is configured to abut an upper cross member 52 of a walker 50 when a diameter 56 of the upper cross member 52 is complementary to each inner surface 46 of each arcuate portion 44 of each support clip 42 such that each support clip 42 is pivotably coupled to the upper cross member 52. The caddy 12 is configured to extend radially from the upper cross member 52 of the walker 50 and is configured to be urged by a gravitational force to pivot about the upper cross member 52 when the caddy 12 is coupled to the upper cross member 52. The caddy 12 is configured to consequently abut a lower cross member 54 of the walker 50 when the caddy 12 is coupled to the upper cross member 52.

Each support clip 42 has a first planar portion 58 parallel to and coupled to an interior surface 60 of the back wall 22 and a second planar portion 62 extending perpendicular to the first planar portion 58 of the support clip 42 between the first planar portion 58 of the support clip 42 and the arcuate portion 44 of the support clip 42. The rim 18 abuts each first planar portion 58 of each support clip 42 and each second planar portion 62 of each support clip 42.

Each of a plurality of first adapter clips 64 is insertable through the arcuate portion 44 of an associated support clip 42, each first adapter clip 64 frictionally engaging the inner surface 46 of the arcuate portion 44 of the associated support clip 42 when inserted through the arcuate portion 44 of the associated support clip 42 so as to be removably coupled to the associated support clip 42. Each first adapter clip 64 has an arcuate portion 66 with an inner surface 68. Each inner surface 68 of each arcuate portion 66 of each first adapter clip 64 faces the exterior surface 48 of the back wall 22. Each inner surface 68 of each arcuate portion 66 of each first adapter clip 64 is configured to abut the upper cross member 52 of the walker 50 when the diameter 56 of the upper cross member 52 is complementary to each inner surface 68 of each arcuate portion 66 of each first adapter clip 64 such that the first adapter clip 64 is pivotably coupled to the upper cross member 52. The caddy 12 is configured to extend radially from the upper cross member 52 of the walker 50 and is configured to be urged by a gravitational force to pivot about the upper cross member 52 when the caddy 12 is coupled to the upper cross member 52. The caddy 12 is configured to consequently abut a lower cross member 54 of the walker 50 when the caddy 12 is coupled to the upper cross member 52.

Each first adapter clip 64 has a first planar portion 70 parallel to and abutting the exterior surface 48 of the back wall 22 and a second planar portion 72 perpendicular to the first planar portion 70 of the first adapter clip 64 extending between the first planar portion 70 of the first adapter clip 64 and the arcuate portion 66 of the first adapter clip 64. Each second planar portion 72 of the first adapter clip 64 abuts an associated second planar portion 62 of the support clip 42.

Each of a plurality of second adapter clips 74 is insertable through the arcuate portion 66 of an associated first adapter clip 64, each second adapter clip 74 frictionally engaging the inner surface 68 of the arcuate portion 66 of the associated first adapter clip 64 when inserted through the arcuate portion 66 of the associated first adapter clip 64 so as to be removably coupled to the associated first adapter clip 64. Each second adapter clip 74 has an arcuate portion 76 with an inner surface 78. Each inner surface 78 of each arcuate portion 76 of each second adapter clip 74 faces the exterior surface 48 of the back wall 22. Each inner surface 78 of each arcuate portion 76 of each second adapter clip 74 is configured to abut the upper cross member 52 of the walker 50 when the diameter 56 of the upper cross member 52 is complementary to each inner surface 78 of each arcuate portion 76 of each second adapter clip 74 such that the second adapter clip 74 is pivotably coupled to the upper cross member 52. The caddy 12 is configured to extend radially from the upper cross member 52 of the walker 50 and is configured to be urged by a gravitational force to pivot about the upper cross member 52 when the caddy 12 is coupled to the upper cross member 52. The caddy 12 is configured to consequently abut a lower cross member 54 of the walker 50 when the caddy 12 is coupled to the upper cross member 52.

Each second adapter clip 74 has a first planar portion 80 parallel to and abutting the first planar portion 70 of the first adapter clip 64 and a second planar portion 82 perpendicular to the first planar portion 80 of the second adapter clip 74 extending between the first planar portion 80 of the second adapter clip 74 and the arcuate portion 76 of the second adapter clip 74. Each second planar portion 82 of the second adapter clip 74 abuts an associated second planar portion 72 of the first adapter clip 64.

A housing 84 is coupled to the front wall 20 and houses a plurality of light sources 86 which emits a light away from an exterior surface 88 of the front wall 20 of the caddy 12 when selectively lit. The housing 84 also houses a power module 90 in a chamber 92 adjacent an end 94 of the housing 84. The power module 90 is selectively electrically couplable to the plurality of light sources 86 such that the plurality of light sources 86 emits a light when coupled to the power module 90. A toggle switch 96 is coupled to the housing 84 and is operationally coupled to the plurality of light sources 86 and the power module 90. The toggle switch 96 is moveable between an on position and an off position such that the toggle switch 96 electrically couples the plurality of light sources 86 to the power module 90 when the toggle switch 96 moves to the on position and electrically decouples the plurality of light sources 86 from the power module 90 when the toggle switch 96 moves to the off position. The toggle switch 96 is positioned on a top surface 98 of the housing 84 adjacent the end 94 of the housing 84. A housing cap 100 is removably couplable to the end 94 of the housing 84 and secures the power module 90 in the chamber 92 when coupled to the housing 84 with the power module 90 in the chamber 92.

In use, a user places a quantity of items 102 in the interior space 26 of the caddy 12 to be carried to another location. The items 102 may include a cup 104 held within the circular member 36. The user then walks to the other location with both hands placed on the walker 50 to stabilize the user during transit. Thus, the user is able to carry the items 102 to the other location by use of the caddy 12 attached to the walker 50. If at least a portion of a path the user wants to follow is dimly lit, the user moves the toggle switch 96 to the on position before using the walker 50. This activates the plurality of light sources 86 and emits the light away from the exterior surface 88 of the front wall 20 of the caddy 12 and in front of the user. By activating the light sources 86 before using the walker 50, the user does not have to release a hand from the walker 50 to reach for a house light switch, which allows the user to keep both hands secured to the walker 50 while walking. After reaching the other location, the user moves the toggle switch 96 to the off position, deactivating the light sources 86.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A walker caddy device comprising:
   a caddy having a bottom wall and a perimeter wall extending upward from said bottom wall to a rim, said perimeter wall including a front wall, a back wall, and a pair of side walls, said perimeter wall circumscribing an interior space;
   a support clip coupled to said back wall, said support clip extending laterally from said back wall, said support clip having an arcuate portion, an inner surface of said arcuate portion of said support clip facing an exterior surface of said back wall,
      wherein said inner surface of said arcuate portion of said support clip is configured to abut an upper cross member of a walker when a diameter of the upper cross member is complementary to said inner surface of said arcuate portion of said support clip such that said support clip is pivotably coupled to the upper cross member,
      wherein said caddy is configured to extend radially from the upper cross member of the walker and is configured to be urged by a gravitational force to pivot about the upper cross member when said caddy is coupled to the upper cross member, said caddy being configured to abut a lower cross member of the walker when said caddy is coupled to the upper cross member;
   a light source coupled to said front wall, said light source being selectively lit, said light source emitting light away from an exterior surface of said front wall when lit; and
   a power module selectively electrically couplable to said light source, said light source emitting light when coupled to said power module.

2. The device of claim 1, further comprising a plurality of first adapter clips, each said first adapter clip being insertable through said arcuate portion of an associated support clip, each said first adapter clip frictionally engaging said inner surface of said arcuate portion of said associated support clip when inserted through said arcuate portion of said associated support clip so as to be removably coupled to said associated support clip, each said first adapter clip having an arcuate portion with an inner surface, each said inner surface of each said arcuate portion of each said first adapter clip facing said exterior surface of said back wall,
   wherein each said inner surface of each said arcuate portion of each said first adapter clip is configured to abut the upper cross member of the walker when a diameter of the upper cross member is complementary to each said inner surface of each said arcuate portion of each said first adapter clip such that said first adapter clip is pivotably coupled to the upper cross member,
   wherein said caddy is configured to extend radially from the upper cross member of the walker and is configured to be urged by a gravitational force to pivot about the upper cross member when said caddy is coupled to the upper cross member, said caddy being configured to abut a lower cross member of the walker when said caddy is coupled to the upper cross member.

3. The device of claim 2, further comprising a plurality of second adapter clips, each said second adapter clip being insertable through said arcuate portion of an associated first adapter clip, each said second adapter clip frictionally engaging said inner surface of said arcuate portion of said associated first adapter clip when inserted through said arcuate portion of said associated first adapter clip so as to be removably coupled to said associated first adapter clip, each said second adapter clip having an arcuate portion with an inner surface, each said inner surface of each said arcuate portion of each said second adapter clip facing said exterior surface of said back wall,
   wherein each said inner surface of each said arcuate portion of each said second adapter clip is configured to abut the upper cross member of the walker when the diameter of the upper cross member is complementary to each said inner surface of each said arcuate portion of each said second adapter clip such that said second adapter clip is pivotably coupled to the upper cross member,
   wherein said caddy is configured to extend radially from the upper cross member of the walker and is configured to be urged by a gravitational force to pivot about the upper cross member when said caddy is coupled to the upper cross member, said caddy being configured to abut a lower cross member of the walker when said caddy is coupled to the upper cross member.

4. The device of claim 1, wherein said support clip is one of a plurality of support clips coupled to said back wall, each said support clip extending laterally from said back wall, each said support clip having an arcuate portion, an inner surface of each said arcuate portion of each said support clip facing an exterior surface of said back wall,
   wherein each said inner surface of each said arcuate portion of each said support clip is configured to abut an upper cross member of a walker when the diameter of the upper cross member is complementary to each said inner surface of each said arcuate portion of each said support clip such that each said support clip is pivotably coupled to the upper cross member,
   wherein said caddy is configured to extend radially from the upper cross member of the walker and is configured to be urged by a gravitational force to pivot about the upper cross member when said caddy is coupled to the upper cross member, said caddy being configured to abut a lower cross member of the walker when said caddy is coupled to the upper cross member.

5. The device of claim 4, wherein each said support clip has a first planar portion parallel to and coupled to an interior surface of said back wall, each said support clip having a second planar portion extending perpendicular to said first planar portion of said support clip between said first planar portion of said support clip and said arcuate portion of said support clip, said rim abutting each said first planar portion of each said support clip and each said second planar portion of each said support clip.

6. The device of claim 4, further comprising a plurality of first adapter clips, each said first adapter clip being insertable through said arcuate portion of an associated support clip, each said first adapter clip frictionally engaging said inner surface of said arcuate portion of said associated support clip when inserted through said arcuate portion of said associated support clip so as to be removably coupled to said associated support clip, each said first adapter clip having an arcuate portion with an inner surface, each said inner surface of each said arcuate portion of each said first adapter clip facing said exterior surface of said back wall,
   wherein each said inner surface of each said arcuate portion of each said first adapter clip is configured to abut the upper cross member of the walker when the diameter of the upper cross member is complementary to each said inner surface of each said arcuate portion of each said first adapter clip such that said first adapter clip is pivotably coupled to the upper cross member, wherein said caddy is configured to extend radially from the upper cross member of the walker and is configured to be urged by a gravitational force to pivot about the upper cross member when said caddy is coupled to the upper cross member, said caddy being configured to abut a lower cross member of the walker when said caddy is coupled to the upper cross member.

7. The device of claim 6, wherein each said first adapter clip has a first planar portion parallel to and abutting said exterior surface of said back wall, each said first adapter clip having a second planar portion perpendicular to said first planar portion of said first adapter clip extending between said first planar portion of said first adapter clip and said arcuate portion of said first adapter clip, each said second planar portion of said first adapter clip abutting an associated second planar portion of said support clip.

8. The device of claim 6, further comprising a plurality of second adapter clips, each said second adapter clip being insertable through said arcuate portion of an associated first adapter clip, each said second adapter clip frictionally engaging said inner surface of said arcuate portion of said associated first adapter clip when inserted through said arcuate portion of said associated first adapter clip so as to be removably coupled to said associated first adapter clip, each said second adapter clip having an arcuate portion with an inner surface, each said inner surface of each said arcuate portion of each said second adapter clip facing said exterior surface of said back wall, wherein each said inner surface of each said arcuate portion of each said second adapter clip is configured to abut the upper cross member of the walker when the diameter of the upper cross member is complementary to each said inner surface of each said arcuate portion of each said second adapter clip such that said second adapter clip is pivotably coupled to the upper cross member, wherein said caddy is configured to extend radially from the upper cross member of the walker and is configured to be urged by a gravitational force to pivot about the upper cross member when said caddy is coupled to the upper cross member, said caddy being configured to abut a lower cross member of the walker when said caddy is coupled to the upper cross member.

9. The device of claim 8, wherein each said second adapter clip has a first planar portion parallel to and abutting said first planar portion of said first adapter clip, each said second adapter clip having a second planar portion perpendicular to said first planar portion of said second adapter clip extending between said first planar portion of said second adapter clip and said arcuate portion of said second adapter clip, each said second planar portion of said second adapter clip abutting an associated second planar portion of said first adapter clip.

10. The device of claim 1, further comprising:
a housing coupled to said front wall, said light source being positioned within and coupled to said housing, said power module being positioned within and coupled to said housing; and
a toggle switch coupled to said housing, said toggle switch being operationally coupled to said light source and said power module, said toggle switch being moveable between an on position and an off position, said toggle switch electrically coupling said light source to said power module when said toggle switch moves to said on position, said toggle switch electrically decoupling said light source from said power module when said toggle switch moves to said off position.

11. The device of claim 10, wherein said light source is one of a plurality of light sources positioned within and coupled to said housing, said plurality of light sources being positioned along a horizontal line within said housing, said plurality of light sources being selectively lit, said plurality of light sources emitting light away from an exterior surface of said front wall when lit, said plurality of light sources being electrically couplable to said power module, said toggle switch electrically coupling said plurality of light sources to said power module when said toggle switch moves to said on position, said toggle switch electrically decoupling said plurality of light sources from said power module when said toggle switch moves to said off position.

12. The device of claim 10, further comprising a housing cap, said housing cap being removably couplable to an end of said housing, said housing having a chamber adjacent said end of said housing for containing said power module, said housing cap securing said power module in said chamber when coupled to said housing with said power module in said chamber.

13. The device of claim 12, wherein said power module comprises a battery.

14. The device of claim 10, wherein said toggle switch is positioned on a top surface of said housing adjacent said end of said housing.

15. The device of claim 1, further comprising a circular member having an axis extending through a center of said circular member, said axis being perpendicular to said bottom wall, an outer edge of said circular member abutting and coupled to an interior edge of said rim of said caddy, said circular member being configured to receive a cup therethrough.

16. The device of claim 1, wherein said perimeter wall of said caddy is constructed of a plurality of perimeter wires extending between said bottom wall and said rim, said bottom wall being constructed of a first plurality of bottom wires extending between said side walls and a second plurality of bottom wires extending between said front wall and said back wall, said rim being constructed of a rim wire extending along a top edge of said perimeter wall.

17. A walker caddy device comprising:
a caddy having a bottom wall and a perimeter wall extending upward from said bottom wall to a rim, said perimeter wall including a front wall, a back wall, and a pair of side walls, said perimeter wall circumscribing an interior space,
wherein said perimeter wall of said caddy is constructed of a plurality of perimeter wires extending between said bottom wall and said rim, said bottom wall being constructed of a first plurality of bottom wires extending between said side walls and a second plurality of bottom wires extending between said front wall and said back wall, said rim being constructed of a rim wire extending along a top edge of said perimeter wall;
wherein each said perimeter wire is parallel to each other perimeter wire, each said bottom wire of said first plurality of bottom wires being parallel to each other bottom wire of said first plurality of bottom wires, each said bottom wire of said second plurality of bottom wires being parallel to each other bottom wire of said second plurality of bottom wires;
a circular member having an axis extending through a center of said circular member, said axis being perpendicular to said bottom wall, an outer edge of said circular member abutting and coupled to an interior edge of said rim of said caddy, said circular member being configured to receive a cup therethrough;

a plurality of support clips coupled to said back wall, each said support clip extending laterally from said back wall, each said support clip having an arcuate portion, an inner surface of each said arcuate portion of each said support clip facing an exterior surface of said back wall, wherein each said inner surface of each said arcuate portion of each said support clip is configured to abut an upper cross member of a walker when a diameter of the upper cross member is complementary to each said inner surface of each said arcuate portion of each said support clip such that each said support clip is pivotably coupled to the upper cross member, wherein said caddy is configured to extend radially from the upper cross member of the walker and is configured to be urged by a gravitational force to pivot about the upper cross member when said caddy is coupled to the upper cross member, said caddy being configured to abut a lower cross member of the walker when said caddy is coupled to the upper cross member, wherein each said support clip has a first planar portion parallel to and coupled to an interior surface of said back wall, each said support clip having a second planar portion extending perpendicular to said first planar portion of said support clip between said first planar portion of said support clip and said arcuate portion of said support clip, said rim abutting each said first planar portion of each said support clip and each said second planar portion of each said support clip;

a plurality of first adapter clips, each said first adapter clip being insertable through said arcuate portion of an associated support clip, each said first adapter clip frictionally engaging said inner surface of said arcuate portion of said associated support clip when inserted through said arcuate portion of said associated support clip so as to be removably coupled to said associated support clip, each said first adapter clip having an arcuate portion with an inner surface, each said inner surface of each said arcuate portion of each said first adapter clip facing said exterior surface of said back wall, wherein each said inner surface of each said arcuate portion of each said first adapter clip is configured to abut the upper cross member of the walker when the diameter of the upper cross member is complementary to each said inner surface of each said arcuate portion of each said first adapter clip such that said first adapter clip is pivotably coupled to the upper cross member, wherein said caddy is configured to extend radially from the upper cross member of the walker and is configured to be urged by a gravitational force to pivot about the upper cross member when said caddy is coupled to the upper cross member, said caddy being configured to abut a lower cross member of the walker when said caddy is coupled to the upper cross member, wherein each said first adapter clip has a first planar portion parallel to and abutting said exterior surface of said back wall, each said first adapter clip having a second planar portion perpendicular to said first planar portion of said first adapter clip extending between said first planar portion of said first adapter clip and said arcuate portion of said first adapter clip, each said second planar portion of said first adapter clip abutting an associated second planar portion of said support clip;

a plurality of second adapter clips, each said second adapter clip being insertable through said arcuate portion of an associated first adapter clip, each said second adapter clip frictionally engaging said inner surface of said arcuate portion of said associated first adapter clip when inserted through said arcuate portion of said associated first adapter clip so as to be removably coupled to said associated first adapter clip, each said second adapter clip having an arcuate portion with an inner surface, each said inner surface of each said arcuate portion of each said second adapter clip facing said exterior surface of said back wall, wherein each said inner surface of each said arcuate portion of each said second adapter clip is configured to abut the upper cross member of the walker when the diameter of the upper cross member is complementary to each said inner surface of each said arcuate portion of each said second adapter clip such that said second adapter clip is pivotably coupled to the upper cross member, wherein said caddy is configured to extend radially from the upper cross member of the walker and is configured to be urged by a gravitational force to pivot about the upper cross member when said caddy is coupled to the upper cross member, said caddy being configured to abut a lower cross member of the walker when said caddy is coupled to the upper cross member, wherein each said second adapter clip has a first planar portion parallel to and abutting said first planar portion of said first adapter clip, each said second adapter clip having a second planar portion perpendicular to said first planar portion of said second adapter clip extending between said first planar portion of said second adapter clip and said arcuate portion of said second adapter clip, each said second planar portion of said second adapter clip abutting an associated second planar portion of said first adapter clip;

a plurality of light sources coupled to said front wall, said plurality of light sources being selectively lit, said plurality of light sources emitting light away from an exterior surface of said front wall when lit;

a power module selectively electrically couplable to said plurality of light sources, said plurality of light sources emitting light when coupled to said power module, said power module comprising a battery;

a housing coupled to said front wall, said plurality of light sources being positioned within and coupled to said housing, said power module being positioned within and coupled to said housing;

a toggle switch coupled to said housing, said toggle switch being operationally coupled to said plurality of light sources and said power module, said toggle switch being moveable between an on position and an off position, said toggle switch electrically coupling said plurality of light sources to said power module when said toggle switch moves to said on position, said toggle switch electrically decoupling said plurality of light sources from said power module when said toggle switch moves to said off position, wherein said toggle switch is positioned on a top surface of said housing adjacent an end of said housing; and a housing cap, said housing cap being removably couplable to said end of said housing, said housing having a chamber adjacent said end of said housing for containing said power module, said housing cap securing said power module in said chamber when coupled to said housing with said power module in said chamber.

\* \* \* \* \*